2,149,649

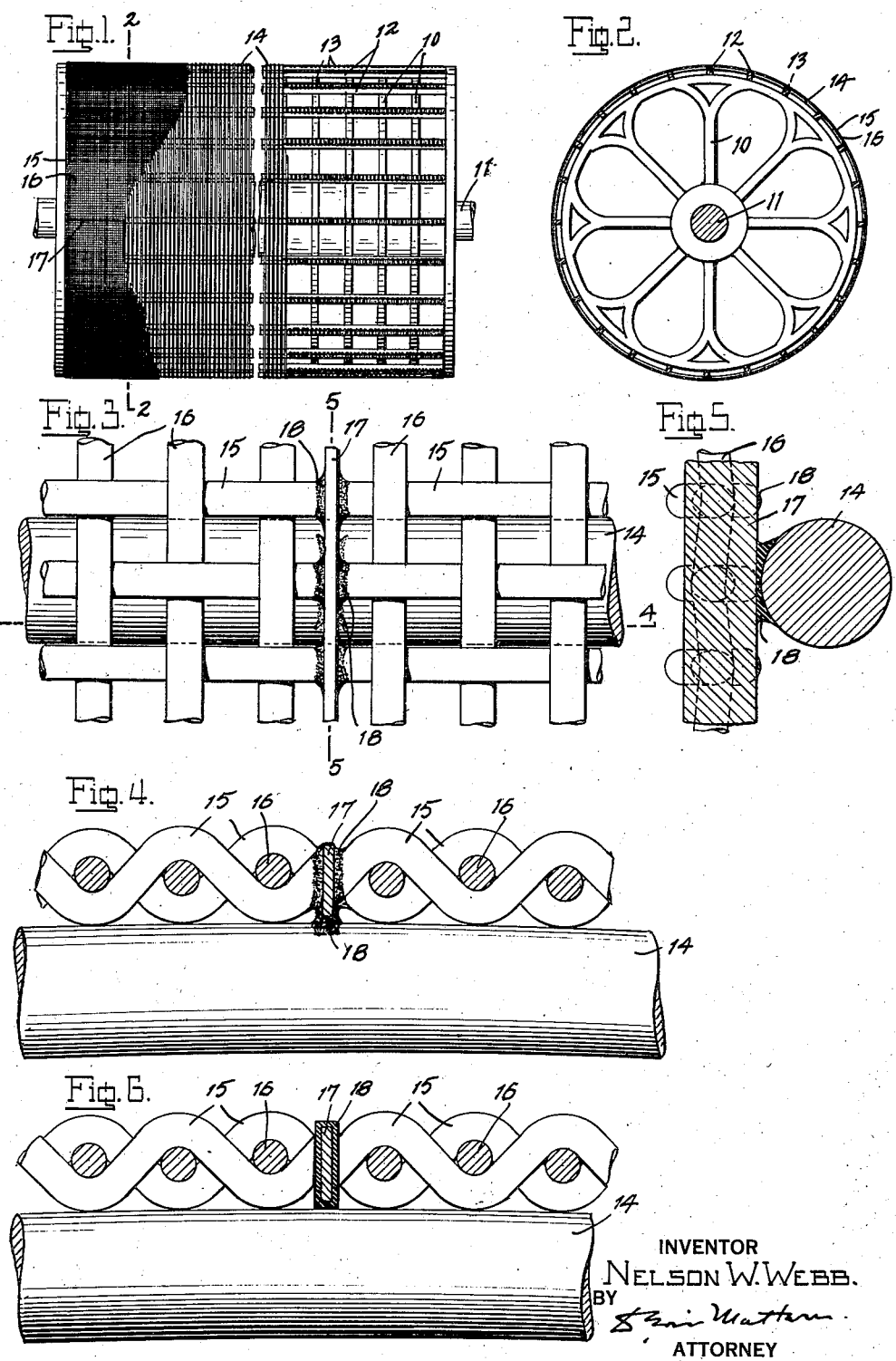
March 7, 1939. N. W. WEBB 2,149,649
COVERING FOR DANDY ROLLS, CYLINDRICAL MOLDS, OR
THE LIKE FOR USE IN PAPER MAKING MACHINES
Filed Aug. 16, 1935   2 Sheets-Sheet 1
INVENTOR
NELSON W. WEBB.
BY
ATTORNEY March 7, 1939.   N. W. WEBB   2,149,649
COVERING FOR DANDY ROLLS, CYLINDRICAL MOLDS, OR
THE LIKE FOR USE IN PAPER MAKING MACHINES
Filed Aug. 16, 1935   2 Sheets-Sheet 2
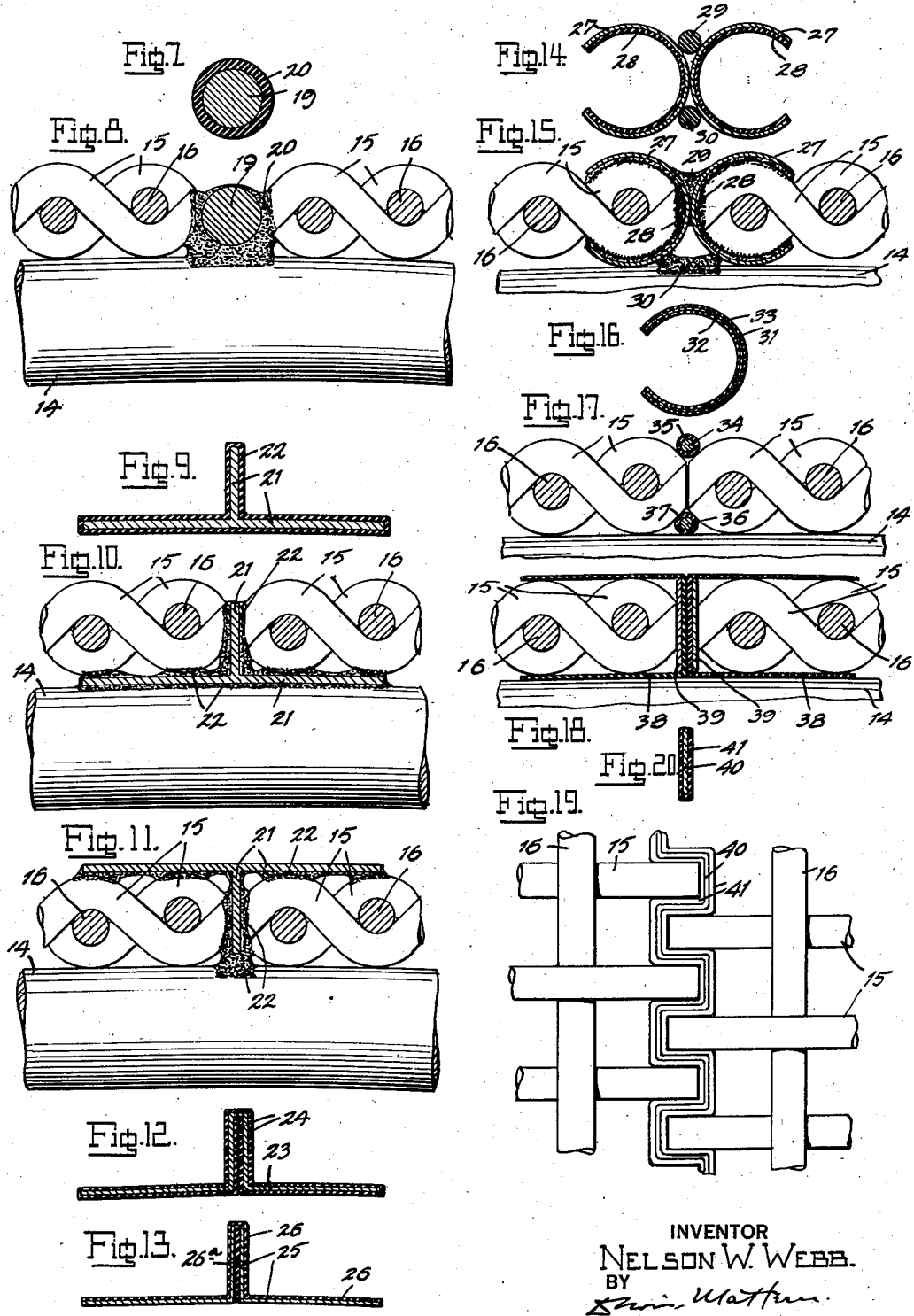
INVENTOR
NELSON W. WEBB.
BY
ATTORNEY Patented Mar. 7, 1939

UNITED STATES PATENT OFFICE 2,149,649

COVERING FOR DANDY ROLLS, CYLINDRICAL MOLDS, OR THE LIKE FOR USE IN PAPER MAKING MACHINES

Nelson W. Webb, Belleville, N. J., assignor to Eastwood-Nealley Corporation, Belleville, N. J., a corporation of New Jersey Application August 16, 1935, Serial No. 36,448

1 Claim. (Cl. 92—48)

The present invention relates to an improvement in covering for dandy rolls, cylindrical molds, or the like for use in paper making machines, and has for an object to provide an improved woven wire covering therefore, the invention residing particularly in the seam structure for this covering. The practice heretofore in covering dandy rolls, cylindrical molds, or the like, with wire cloth, has been to provide a laced seam to secure the ends of the wire cloth together, and this has not only been unsatisfactory because the seam would readily become broken, but there was a tendency for the wire cloth to creep about the cylindrical structure. It is proposed in the present invention to provide a seam in which the ends of the wire cloth are brazed or soldered together, and further to provide a connection in the form of brazed or soldered joints between the seam structure and the cylindrical supporting surface of the roll or mold upon which the wire cloth is mounted, this connection securely holding the wire cloth against any tendency to creep.

With the above and other objects in view, embodiments of the invention are shown in the accompanying drawings, and these embodiments will be hereinafter more fully described with reference thereto, and the invention will be finally pointed out in the claim.

In the drawings:

Fig. 1 is a side elevation, partially broken away, of a dandy roll or cylindrical mold structure, the woven wire covering being broken away to show the cylindrical supporting wire structure beneath it, and a portion of the cylindrical supporting wire structure being broken away to show the supporting frame structure thereof.

Fig. 2 is a sectional view along the line 2—2 of Fig. 1.

Fig. 3 is an enlarged plan view of the seam structure, according to one embodiment of the invention, one of the cylindrical supporting wires being shown in relation thereto.

Fig. 4 is a sectional view taken along the line 4—4 of Fig. 3.

Fig. 5 is a sectional view taken along the line 5—5 of Fig. 3.

Fig. 6 is a sectional view similar to Fig. 4, and showing the seam forming solder covered wire in place between the ends of the wire cloth, and before the application of heat to fuse it.

Fig. 7 is a sectional view of a modified form of the solder covered seam forming wire.

Fig. 8 is a sectional view showing the wire illustrated in Fig. 7 in its seam forming brazed relation to the woven wire ends and the cylindrical supporting wire.

Fig. 9 is a sectional view of another modified form of solder covered seam forming wire.

Fig. 10 is a sectional view showing the wire as shown in Fig. 9 in its seam forming relation to the woven wire ends and the cylindrical supporting wire.

Fig. 11 is a view similar to Fig. 10, but showing the seam forming wire in a modified relation, i. e., inverted to that shown in Fig. 10.

Fig. 12 is a sectional view of a further modified form of seam forming wire.

Fig. 13 is a sectional view of a still further modified form.

Fig. 14 is a sectional view showing a pair of seam forming wires for engagement with the ends of the wire cloth and soldering wires in relation thereto.

Fig. 15 is a sectional view showing the seam forming wires illustrated in Fig. 14 in their seam forming relation to the woven wire ends and the cylindrical supporting wire.

Fig. 16 is a sectional view of a modified form of the seam forming wire as illustrated in Fig. 14.

Fig. 17 is a sectional view of another modification, in which solder covered wires are provided in relation to the woven wire ends and the cylindrical supporting wire, the same being shown before application of heat.

Fig. 18 is a sectional view of still another modification in which seam forming wires of U-shape cross-section are engaged with the woven wire ends, the same being shown before the application of heat.

Fig. 19 is a plan view of a still further modification of seam, particularly adapted for coarse weave wires.

Fig. 20 is a sectional view of the seam forming wire, as employed in the form shown in Fig. 19.

Similar reference characters indicate corresponding parts throughout the several figures of the drawings.

Referring to the drawings and more particularly to Figs. 1 and 2 the dandy roll or cylindrical mold structure comprises a series of circular frame members 10 mounted upon a shaft 11 these frame members having longitudinally extending bars 12 secured to their peripheries, and these bars being provided with a series of grooves 13 in which is engaged the spirally wound wire 14 forming the cylindrical supporting surface upon which the woven wire covering is engaged and supported. In practice dandy rolls are substantially smaller than cylinder molds, but the constructions of the two are substantially similar in principle, and it will be understood that the present invention not only contemplates dandy rolls and cylindrical molds, but any other cylindrical structure in which a woven wire covering is adapted to be mounted upon a cylindrical support.

The woven wire consists of warp wires 15 and weft wires 16 interwoven therewith, and while I have shown straight weave wire it will be understood that other types of weaves may be employed within the scope of the invention. Referring particularly to Figs. 3 to 6 the seam is produced by means of a flat ribbon-like wire 17 provided with a solder covering 18, the ends of the woven wire being ground flat and the seam forming wire being disposed in upright relation between these ends. Heat is thereupon applied and the solder becomes fused with the warp wire ends, as shown in Fig. 4, to thereby securely join the ends of the woven wire together. At the same time the solder covering connects with the spiral windings of the cylindrical supporting wire 14 and as these extend entirely along the length of the seam it will be seen that any creeping of the seam is effectually prevented. The brazed seam furthermore provides a smooth and a more uniform surface than is the case with the seams formed by lacing wires.

In Figs. 7 and 8 I have shown a modification in which the seam forming wire 19 is of circular cross-section and is provided with a silver solder covering 20. This wire is placed between the warp ends of the woven wire and upon the application of heat the solder connects the warp ends together and also connects the seam to the cylindrical supporting wire 14.

In Fig. 9 I have shown a modification in which the seam forming wire 21 has a cross-sectional shape in the form of an inverted T and is covered with silver solder 22. In this case the upright portion of the wire engages between the warp wire ends, while the transverse portion extends beneath the end knuckles and rests upon the cylindrical supporting wire 14. Upon the application of heat the solder covering brazes not only the warp ends of the woven wire, but also connects the end knuckles with the seam forming wire 21 and at the same time the seam forming wire becomes brazed to the cylindrical supporting wire 14. The relatively long transverse portion 21 of the seam forming wire provides a seam of great resistance against any tendency to pull apart and also provides a more extensive connection of the seam with the cylindrical supporting wires.

In Fig. 10 I have shown another modification in which the seam forming wire 21, as shown in Fig. 9, is assembled with the woven wire ends in inverted relation, that is, with the transverse portion at the outer side.

In Fig. 12 I have illustrated a further modification, substantially similar to that shown in Fig. 9, but in which a seam wire 23 of flat form is covered at both sides with solder 24 and is bent upwardly in the middle to produce a flange for engagement between the woven wire ends.

In Fig. 13 I have shown a further modification in which a seam forming wire 25, substantially similar to that shown in Fig. 12, is provided with silver solder 25 at one side only, and in the fold of the bent up flange there is engaged a strip 26ª of silver solder.

In Figs. 14 and 15 I have shown a modification of the invention in which each end of the woven wire in encased in a seam forming wire 27 of substantially horse-shoe-shape in cross-section and provided at its inner surface with a coating of silver solder 28. Upon the application of heat the solder coating brazes the wires 27 about the warp wire ends as shown in Fig. 15. At the same time the warp wire ends are secured together by placing silver solder wires 29 and 30 between the ends and which upon the application of heat braze together the wires 27 and also braze them to the cylindrical supporting wires 14.

In Fig. 16 I have shown a modification of the form of wire illustrated in Fig. 14 and which comprises a wire 31 of horse-shoe-shape in cross-section provided at its inner side with a silver solder coating 32 and at its outer side with a silver solder coating 33. In this case the solder coating 32 will connect the wire to the warp wire ends and the solder coating 33 will connect it to the seam forming wires at the two ends of the wire cloth together.

In Fig. 17 I have illustrated a modification in which the seam is produced by a seam forming wire 34 having a silver solder coating 35, this wire being placed in the recess formed between the abutting ends of the woven wire, a seam forming wire 36 also provided with a silver solder coating 37 being placed in the recess at the under side of the ends of the woven wire and in contact with the cylindrical supporting wire 14. Upon the application of heat the solder coats will cause the two ends of the woven wire to be brazed together and at the same time the seam structure will be connected to the cylindrical supporting wire 14 by brazed joints.

In Fig. 18 I have illustrated another modification in which the two ends of the woven wire are embraced by U-shaped silver solder strips 38, a flat wire 39 being disposed between the bases of these strips and the ends of the warp wires. Upon the application of heat the solder strips connect together the two wires 39 and connect also the ends of the warp wires to the wires 39 to form the seam. At the same time the seam is soldered to the cylindrical supporting wire 14.

In Figs. 19 and 20 I have illustrated a still further modification particularly adapted for coarse weave wires. In this case the weft wire ends are in staggered relation and the wires of one end are disposed between the passages of the warp wires of the other end. The seam forming wire consists of a flat strip 40 provided with a solder covering 41 and which is given a substantially serpentine shape corresponding to the space formed about the warp ends of the woven wire, this solder covered wire being placed in this space about the warp wire ends as clearly shown in Fig. 19. Upon the application of heat the wire 20 forms a brazed connection between the warp wire ends and at the same time the cylindrical supporting wire 14 is brazed to the seam.

I have illustrated and described preferred and satisfactory embodiments of the invention, but it will be obvious that changes may be made therein, within the spirit and scope thereof, as defined in the appended claim.

Having thus described my invention what I claim and desire to secure by Letters Patent is:

In a dandy roll, cylindrical mold, or the like, a cylindrical wire supporting surface, a woven wire covering therefor, comprising a length of woven wire fabric, having its ends disposed in opposed relation along a line parallel to the axis of said supporting surface and circumferentially butted and joined by fusion with a solder strip disposed between said opposed ends and also engaged and fused with said supporting surface, the seam formed thereby being entirely below the cylindrical surface of said covering fabric and constituting a common connection between the opposed ends of said fabric and between said covering and said supporting surface.

NELSON W. WEBB.